United States Patent
Xu

(10) Patent No.: US 9,921,413 B2
(45) Date of Patent: Mar. 20, 2018

(54) 3D IMAGE SYSTEM, METHOD, AND APPLICATIONS

(71) Applicant: Jing Xu, Irvine, CA (US)

(72) Inventor: Jing Xu, Irvine, CA (US)

(73) Assignee: DEEPSEE INC., Irvine, CA (US)

( * ) Notice: Subject to any disclaimer, the term of this patent is extended or adjusted under 35 U.S.C. 154(b) by 132 days.

(21) Appl. No.: 14/874,057

(22) Filed: Oct. 2, 2015

(65) Prior Publication Data

US 2017/0097511 A1 Apr. 6, 2017

(51) Int. Cl.
| | | |
|---|---|---|
| G02B 27/24 | (2006.01) | |
| G02B 27/22 | (2018.01) | |
| H04N 13/04 | (2006.01) | |
| G02B 27/01 | (2006.01) | |
| G02B 27/10 | (2006.01) | |
| G02B 26/08 | (2006.01) | |

(52) U.S. Cl.
CPC ..... *G02B 27/2221* (2013.01); *G02B 26/0816* (2013.01); *G02B 27/0172* (2013.01); *G02B 27/1066* (2013.01); *H04N 13/042* (2013.01); *H04N 13/0429* (2013.01); *G02B 2027/0134* (2013.01)

(58) Field of Classification Search
CPC .... G02B 27/2271; G02B 27/00; G02B 27/01; G02B 2027/011; G02B 2027/0112; G02B 2027/0116; G02B 2027/0143; G02B 2027/0145; G02B 2027/0152; G02B 2027/0154; G02B 2027/0159; G02B 27/0101; G02B 27/011; G02B 27/0112; G02B 27/0116; G02B 27/0143; G02B 27/0145; G02B 27/0149; G02B 27/0152; G02B 27/0154; G02B 27/0159; G02B 27/017; G02B 27/0172; G02B 27/0185; G02B 26/00; G02B 26/08; G02B 26/0816; G02B 26/0833; G02B 26/0841; G02B 26/085; G02B 26/0858; G02B 26/0866; H04N 13/00; H04N 13/04; H04N 13/042; H04N 13/0429
See application file for complete search history.

(56) References Cited

U.S. PATENT DOCUMENTS

| | | | |
|---|---|---|---|
| 5,642,227 A | 6/1997 | Rallison | |
| 7,372,614 B2 * | 5/2008 | Govil ................ | G02B 26/0825 359/290 |
| 8,508,851 B2 | 8/2013 | Miao et al. | |

(Continued)

OTHER PUBLICATIONS

Hua et al., Mar. 2001, "An Ultra-Light and Compact Design and Implementation of Head-Mounted Projective Displays", Virtual Reality, 2001. Proceedings. IEEE, Conference Yokohama, Japan, pp. 175-182, DOI 10.1109/VR.2001.913784.

*Primary Examiner* — Ricky Mack
*Assistant Examiner* — Robert E Tallman
(74) *Attorney, Agent, or Firm* — Bond, Schoeneck & King, PLLC; William Greener

(57) ABSTRACT

Apparatus (systems) and methods are described for generating and displaying a virtual true 3D image viewable by a single eye of a viewer. A fixed-curve mirror is translated along an optical axis in synchrony with a temporally-modulated 2D image generator to generate a virtual image in multiple virtual image planes, enabling depth perception of the image by a single eye of the viewer.

27 Claims, 10 Drawing Sheets

(56) References Cited

U.S. PATENT DOCUMENTS

| | | | | |
|---|---|---|---|---|
| 2009/0243963 A1* | 10/2009 | Hotta | ................ | G02B 27/0093 345/7 |
| 2011/0075257 A1* | 3/2011 | Hua | ................... | G02B 27/017 359/464 |
| 2012/0013988 A1* | 1/2012 | Hutchin | ............ | G02B 27/0172 359/631 |
| 2013/0021658 A1 | 1/2013 | Miao et al. | | |

\* cited by examiner

3D IMAGE SYSTEM, METHOD, AND APPLICATIONS

RELATED APPLICATION DATA

N/A.

BACKGROUND

1. Field of the Invention

Embodiments of the invention are generally in the field of optical image generation and display. More particularly, apparatus and methods are disclosed for generating and displaying a true 3D image; most particularly, a wearable near-eye apparatus for generating and displaying a true 3D image viewable by a single eye of a viewer, and applications thereof.

2. Related Art

The display of 3D images in two-dimensional media has conventionally used well-known stereoscopic techniques. These involve presenting two slightly different views of the same 2D image, one to each eye, to realize a 3D effect. However, each eye still has to focus on a fixed distance where the 2D image plane is located, forcing the eyes to converge at different distances to perceive objects at different depths. These erroneous focus cues can be discomforting as well as producing pseudo-3D images that lack high fidelity. This is quite different for each eye when seeing the real, 3D world. Even the single eye of a viewer can adjust its focus to see the object at different distances or depths. The reader is directed to US Publication 2011/0075257 for an informative background discussion on the shortcomings of existing stereoscopic 3D display technology and alternative 3D display approaches, the subject matter of which is incorporated herein by reference in its entirety.

The '257 publication also discloses three-dimensional electro-optical displays that can be head-worn or otherwise placed relative to a person's eyes in a manner allowing the person to view images rendered by the display. The disclosed invention utilizes a 2D micro-display in conjunction with an active optical element (e.g., liquid lens, adaptive mirror) such that a change in the optical power of the active element moves an intermediate image whose distance at which the micro-display-generated image is formed can serve as an accommodation cue for the person with respect to the intermediate image. The disclosed technology, however, is complex and may not provide a desired level of image quality.

There exists a need for a 3D image display that is technically simple and robust, produces high fidelity 3D images, allows true 3D image viewing, is comfortable to use without adverse physiological effects, and otherwise addresses the know shortcomings and disadvantages in the art. The embodied invention, described in detail below and in the appended claims, provides solutions to the problems associated with convention 3D image display and offers commensurate advantages and benefits.

DEFINITION OF TERMS

The following terms, among others, will be used herein in describing non-limiting, exemplary, and illustrative embodiments and aspects of the invention, and are described below to assist the reader in clearly understanding the invention.

A 'see-through' display is a display that the user can see through to the real world beyond the display. Superimposed on the image of the real world, as seen through the display, is one or more virtual objects formed and placed by the display. Such displays are advantageously used in AR systems. An aspect of the disclosed see-through display is a wearable near-eye apparatus.

A 'non-see-through' is a display that presents an image to the user without necessarily allowing a real-world view. Such displays are advantageously used in VR systems. An aspect of the disclosed non-see-through display is a wearable near-eye apparatus.

A 2D 'micro-display' is an addressable image source, e.g., OLED (organic light-emitting diode), LCOS (liquid crystal on silicon), DLP (digital light processor), LCD (liquid crystal display) that can generate a temporally-modulated 2D image.

A 'true 3D image' is an image with actual (perceivable) depth extension as well as lateral (2D) extension such that the eye can adjust its focus to see the image with depth extension.

SUMMARY

Embodiments of the invention are apparatus (system) and methods enabling the viewing of true 3D images by a single, or both eyes of a viewer. The embodied invention finds application in the fields including, but not limited to, augmented reality (AR) and virtual reality (VR).

An exemplary aspect is an optical viewing system for generating a virtual image viewable in 3D by a single eye of a viewer. The optical viewing system includes a converging fixed-curve mirror that is characterized by a focal point and a vertex, which is located along an optical axis of the system; an actuator coupled to the fixed-curve mirror that can impart a translational motion over a distance, d, to the fixed-curve mirror along the optical axis; a first addressable image-generator located along the optical axis that is configured to generate a time modulated, 2D real image; a first beam splitter located along the optical axis between the fixed-curve mirror and the first addressable image-generator, the orientation of which defines an optical viewing axis, wherein a virtual image of the time modulated, 2D image is formed at a distance, c, from the first beam splitter along the optical viewing axis, further wherein, upon reciprocating translational motion of the fixed-curve mirror over the distance, d, a sequential plurality of 2D virtual images are formed, respectively, at distances c+Δc (i.e., in a series of multiple virtual image planes), from the first beam splitter along the optical viewing axis, further wherein, upon temporal synchronization of the reciprocating translational motion of the fixed-curve mirror and the time modulated, 2D image, a virtual true 3D image is formed and viewable by a single eye of the viewer positioned along the optical viewing axis. The pupil of the viewer's eye is the aperture stop of the optical viewing system. In various non-limiting, exemplary embodiments the system may include some or all of the following components, limitations, and/or characteristics:

further comprising a second beam splitter disposed along the optical axis of the system between the addressable image-generator and the first beam splitter, the orientation of which defines another optical axis; and a second addressable image-generator disposed along the other optical axis;

wherein the first addressable image-generator has a curved surface;

wherein the first and second addressable image-generators have curved surfaces;

wherein the fixed-curve mirror is rotatable along at least one axis that is orthogonal to the optical axis;

wherein the first and second addressable image-generators are one of an OLED, a LCOS, a DLP, a LCD;
wherein the actuator is a MEMS or silicon-based device;
wherein the actuator is a piezo-based device;
wherein the actuator is a VCM (Voice Coil Motor) or VCA (Voice Coil Actuator)-based device;
comprising a see-through optical viewing system;
wherein the fixed-curve mirror is rotatable along at least one axis that is orthogonal to the optical axis;
wherein the fixed-curve mirror has a spherical reflection surface;
wherein the fixed-curve mirror has an aspheric reflection surface:
wherein the first addressable image-generator is one of an OLED, a LCOS, a DLP, a LCD;
wherein the virtual true 3D image is viewable by a left eye of the viewer;
wherein the virtual true 3D image is viewable by a right eye of the viewer;
wherein the actuator is a MEMS or silicon-based device;
wherein the actuator is a piezo-based device;
wherein the actuator is a VCM (Voice Coil Motor) or VCA (Voice Coil Actuator)-based device;
comprising a see-through optical viewing system;
wherein at least a portion of the optical axis of the system consists of the optical viewing axis and the fixed-curve mirror and the coupled actuator are disposed along the optical viewing axis;
further comprising a second beam splitter disposed along the optical axis of the system between the addressable image-generator and the first beam splitter, the orientation of which defines an another optical axis; and a second addressable image-generator disposed along the other optical axis.
comprising a non-see-through optical viewing system;
comprising a non-see-through optical viewing system.

An exemplary aspect is a method for generating a virtual true 3D image viewable by a single eye of a viewer. The method includes the steps of providing an optical viewing system that includes a fixed-curve mirror that is characterized by a focal point and a vertex, which is located along an optical axis of the system; an actuator coupled to the fixed-curve mirror that can impart a reciprocating translational motion over a distance, d, to the fixed-curve mirror along the optical axis; a first addressable image-generator located along the optical axis that is configured to generate a time modulated, 2D real image; a first beam splitter located along the optical axis between the fixed-curve mirror and the first addressable image-generator, the orientation of which defines an optical viewing axis; forming a virtual image of the time modulated, 2D image at a distance, c, from the first beam splitter along the optical viewing axis; reciprocally translating the fixed-curve mirror over the distance, d; forming a sequential plurality of 2D virtual images, respectively, at distances c+Δc (i.e., in a series of multiple virtual image planes), from the first beam splitter along the optical viewing axis; and synchronizing the reciprocating translational motion of the fixed-curve mirror and the time modulated, 2D real image such that a virtual true 3D image is formed and viewable by a single eye of the viewer positioned along the optical viewing axis. The pupil of the viewer's eye is the aperture stop of the optical viewing system. In various non-limiting, exemplary embodiments the method may include some or all of the following steps, limitations, and/or characteristics:

rotating the fixed-curve mirror rotatable along at least one axis that is orthogonal to the optical axis.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF FIGURES

DETAILED DESCRIPTION OF EXEMPLARY, NON-LIMITING EMBODIMENTS OF THE INVENTION

Figure 1:
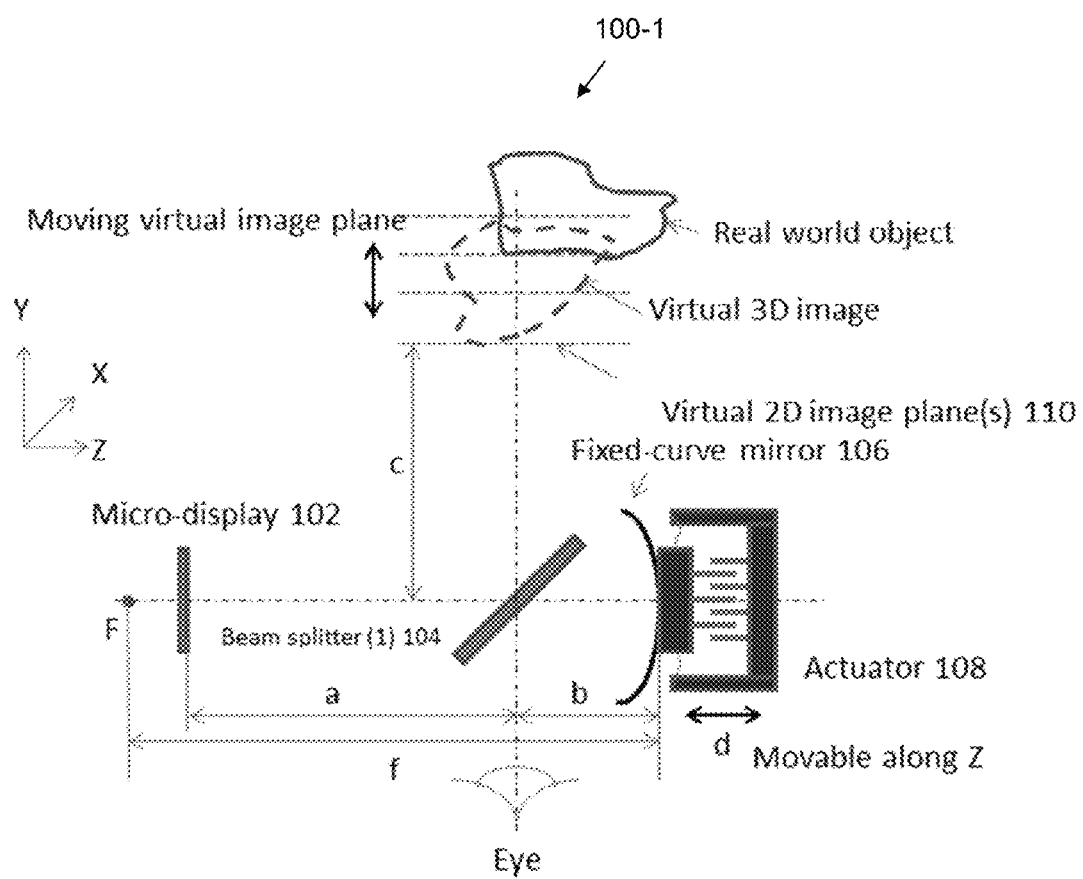
FIG. 1 illustrates a monocular 3D display suitable for AR technology, according to an exemplary embodiment of the invention.
Figure 2:
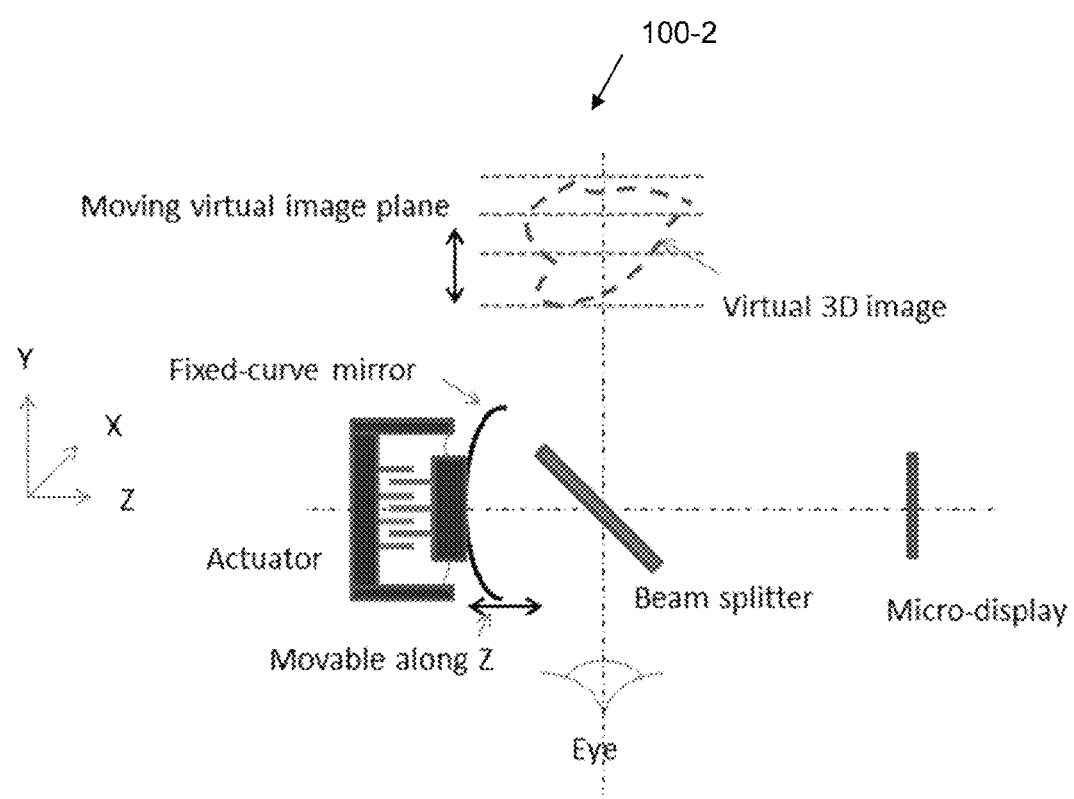
FIG. 2 illustrates a mirror-image monocular 3D display of FIG. 1 that can be used with the viewer's other eye to form a binocular system, according to an exemplary embodiment of the invention.

FIG. 1 is a top plan schematic illustration of an exemplary monocular (left eye) 3D display 100-1 suitable for AR technology; i.e., it is a 'see-through' display. FIG. 2 shows an identical, mirror image system 100-2 for a right eye of the viewer that can be used alone or in combination with system 100-1 as a binocular system. The systems are illustrated with respect to an x-y-z Cartesian coordinate system as shown inset in the figures.

System 100-1 (and likewise, system 100-2) incorporates a 2D image generator or image source 102 (herein referred to as 'micro-display' 102) disposed along an optical, z-axis of the system, a beam-splitter 104 disposed along the optical, z-axis of the system, a fixed-curve mirror 106 disposed along the optical, z-axis of the system, and an actuator 108 coupled to the fixed-curve mirror that can impart a reciprocating translational motion over a distance, d, to the fixed-curve mirror along the optical, z-axis. The micro-display 102 may be an OLED, LCOS, DLP, LCD or other suitable micro-display as known in the art; the fixed-curve 104 mirror can be concave spherical or aspheric; and the actuator may be a MEMS- or piezo-based device, or other suitable actuation mechanism as known in the art. The beam splitter is oriented at 45 degrees with the y-axis (and z-axis) to fold the optical axis from the z- to y-axis, which is also a viewing axis for the eye of a user (viewer) wearing the display on the user's head. A viewer's eye would be placed along the viewing, y-axis as illustrated. As discussed in detail immediately below, multiple virtual image planes are formed in the x-z plane along the y-axis with the movement of the fixed-curve mirror.

Referring further to FIG. 1, assume the distance from the 2D micro-display 102 to the center of beam splitter ($BS_1$) 104 is a, and from the center of $BS_1$ 104 to an initial vertex position of the fixed-curve mirror is b. The curvature radius of the fixed-curve mirror at its vertex is R. F represents the focal point of fixed-curve mirror 104 and f is its focal length. The relationship between R and f can be expressed as:

$$f=R/2. \quad (1)$$

The 2D micro-display will be located intermediate the focal point F and the mirror's vertex; i.e., $$a+b<f. \quad (2)$$

The 2D micro-display image light passes through $BS_1$ to the fixed-curve mirror, which reflects it back to $BS_1$ and is folded to form a magnified virtual image in a virtual image plane 110 at a distance c from $BS_1$ along the viewing, y-axis, superimposed or presented along with the view of the "real world" being perceived by a user wearing or otherwise using the display. The relationship of all the parameters mentioned follows as:

$$[1/(a+b)]+[1/(c+b)]=1/f. \quad (3)$$

The magnification, M, of the virtual image is $$M=-(c+b)/(a+b). \quad (4)$$

Here, f is positive for a converging mirror, (a+b) is positive, and (c+b) is negative for a virtual image.

When the fixed-curve mirror 106 is translated by ±d, the position of the virtual image at c also changes by ±Δc along the viewing, y-axis. When image on the 2D micro-display is time-modulated and the movement of the fixed-curve mirror is synchronized, a virtual 3D image is formed with depth ±Δc that can be seen by a single eye of the viewer as a virtual true 3D image.

Figure 3:
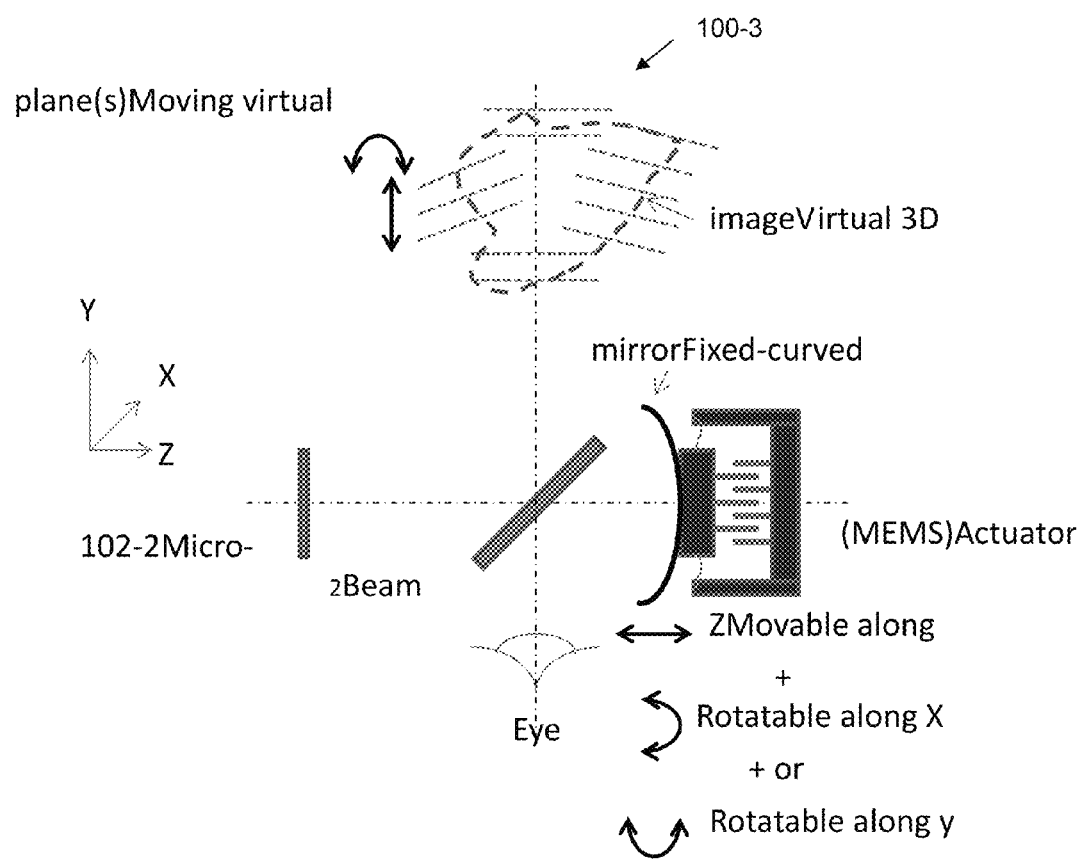
FIG. 3 illustrates a monocular 3D display suitable for AR technology (i.e., a see-through display) in which the fixed-curve mirror can rotate about the x-axis and/or y-axis as well as translate along z-axis, according to an exemplary embodiment of the invention.

FIG. 3 shows a system 100-3 in which, in addition to the movement of the fixed-curve mirror along the z-direction, it can also rotate about the x-axis and/or the y-axis. When the mirror rotates about the x-axis, the virtual image also rotates about the x-axis with displacement along the z-axis. When the mirror rotates along the y-axis, the virtual image will rotate about the z-axis with displacement along the x-axis. This provides additional benefits for the synthesized 3D virtual image. For example, the 3D image could be "patched" to a larger image with larger field-of-view (FOV). It would only use the small central area of the 2D micro-display to "patch" a higher resolution 3D image. If working with eye-tracking technology, it would only "point" the image to where the viewer's eye is focused. This could increase the 3D image resolution and FOV, and reduce the data rate because a relatively smaller image will be generated on the 2D micro-display.

Figure 4:
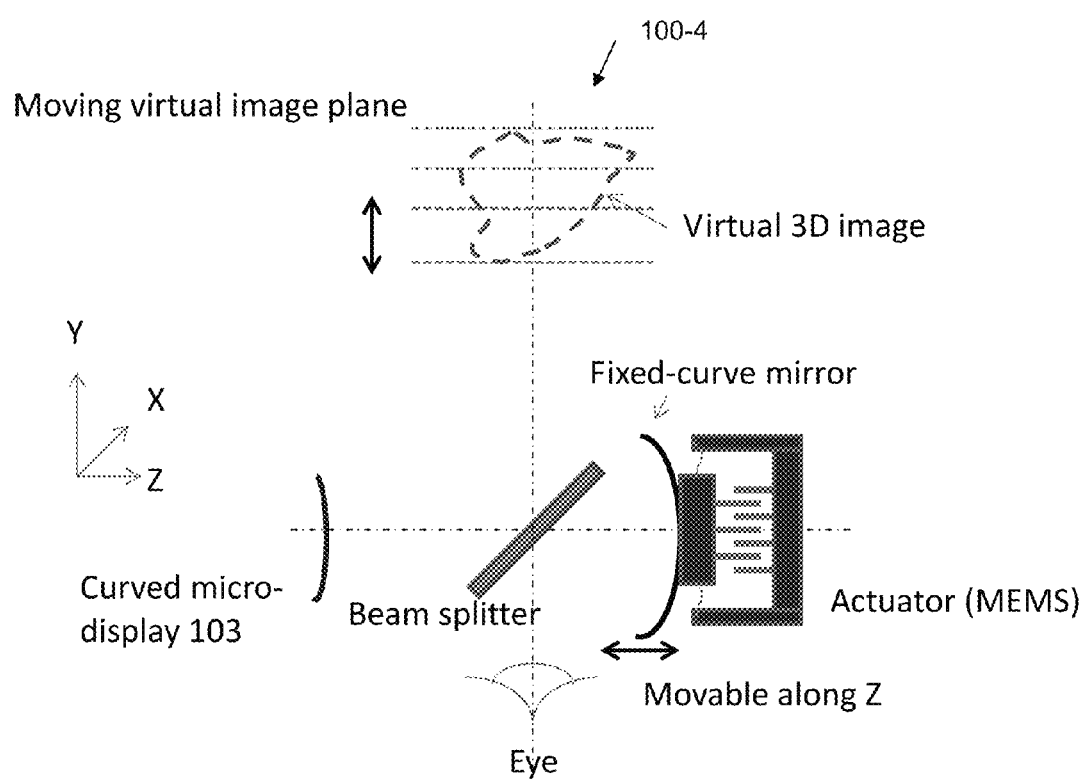
FIG. 4 illustrates a monocular 3D display suitable for AR technology in which a curved micro-display is used to compensate fixed-curve mirror-induced field curvature and aberrations, according to an exemplary embodiment of the invention.

FIG. 4 shows an alternative embodiment of a system 100-4 in which the micro-display 102 has a curved, rather than flat, surface 103. Such a micro-display may be an OLED, for example. The curved micro-display surface 103 could be made to compensate for field curvature induced by the fixed-curve mirror and other aberrations.

Figure 5:
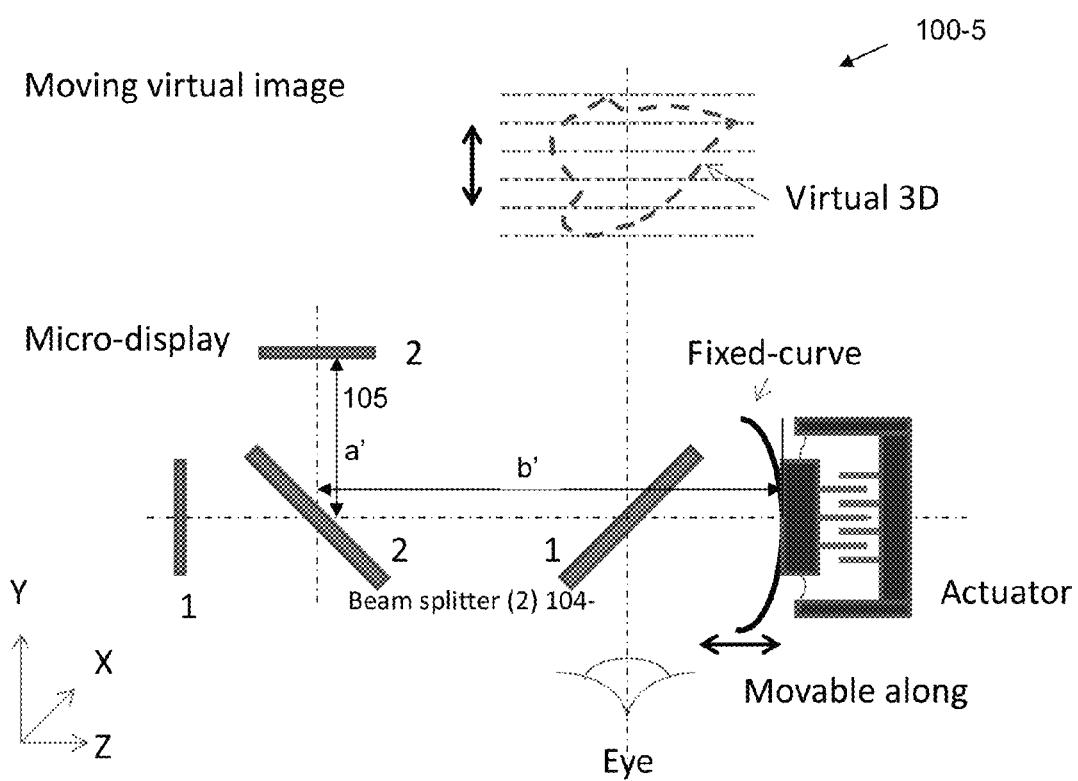
FIG. 5 illustrates a monocular 3D display suitable for AR technology in which a second micro-display is used so as to increase the resolution of the 3D image and reduce the movement of the fixed-curve mirror and/or the data rate, according to an exemplary embodiment of the invention.

FIG. 5 illustrates a system 100-5 that utilizes a second micro-display 102-2. A second beam splitter ($BS_2$) 104-2 is disposed along the optical, z-axis of the system between the first micro-display 102 and $BS_1$ 104, the orientation of which defines another optical axis 105. The second addressable micro-display 102-2 is disposed along the other optical axis 105. Its distance to the curved mirror (a'+b') is different than (a+b) in FIG. 1, but less than f. This insures that there are always two virtual images formed simultaneously, one from 102-1 and another from 102-2. The use of the second micro-display may advantageously increase the resolution of the 3D image, reduce the movement of curved mirror and/or the data rate to generate 2D image on micro-display.

Figure 6:
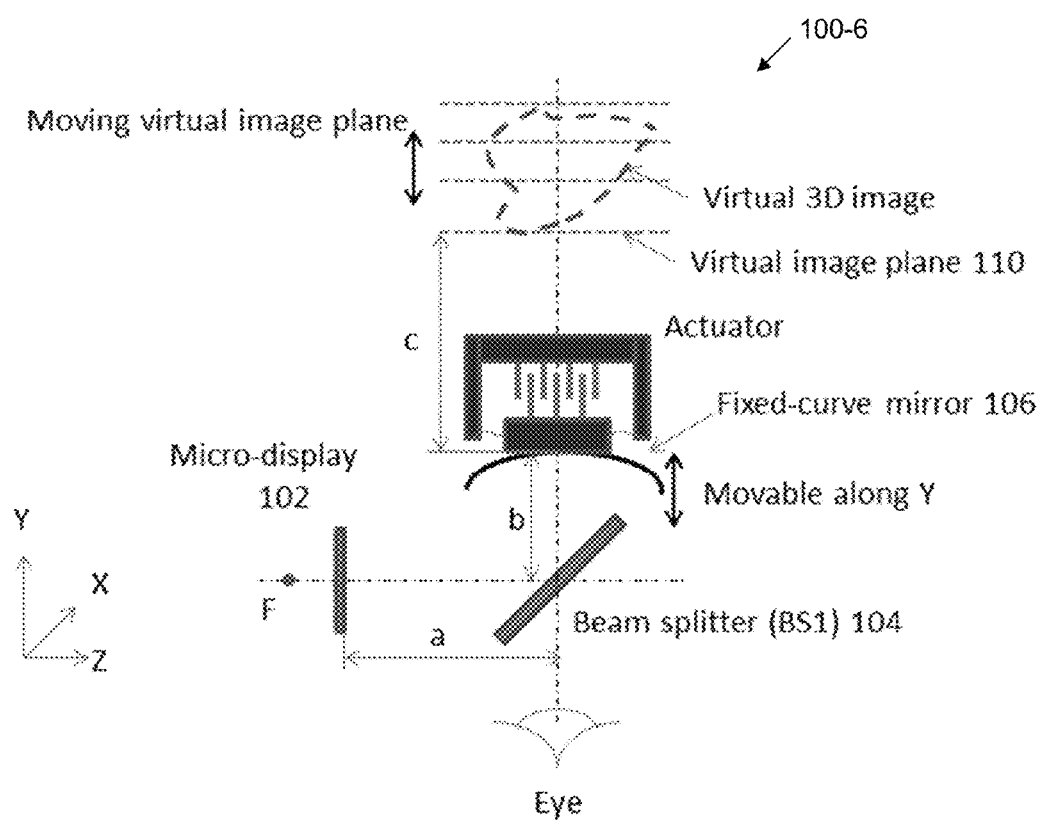
FIG. 6 illustrates a monocular 3D display suitable for VR technology (i.e., not a see-through display) that is optically identical to the system of FIG. 1, according to an exemplary embodiment of the invention.

A non-see-through, virtual reality-adapted system 100-6 is illustrated in FIG. 6. While the optical operation of system 100-6 is identical to the previously disclosed systems, the fixed-curve mirror is located directly along the viewing, y-axis as shown.

Referring to FIG. 6, assume the distance from the 2D micro-display 102 to the center of beam splitter ($BS_1$) 104 is a, and from the center of $BS_1$ 104 to an initial vertex position on the fixed-curve mirror is b. The curvature radius of the fixed-curve mirror at its vertex is R. F represents the focal point of fixed-curve mirror 104 and f is its focal length. The relationship between R and f still holds as Eq. 1. The relationship between (a+b) and f also holds as Eq. 2. The real 2D micro-display image light is reflected from $BS_1$ to the fixed-curve mirror, which reflects it back to $BS_1$ and forms a magnified virtual image in a virtual image plane 110 at a distance c from the vertex of the fixed-curve mirror along the viewing, y-axis, being perceived by a user wearing or otherwise using the display. The relationship of all the parameters mentioned follows as:

$$[1/(a+b)]+[1/c]=1/f \quad (5)$$

The magnification, M, of the virtual image is $$M=-c/(a+b). \quad (6)$$

Here, f is positive for a converging mirror, (a+b) is positive, and c is negative for a virtual image.

When the fixed-curve mirror 106 is translated by ±d, the position of the virtual image at c also changes by ±Δc along the viewing, y-axis. When image on the 2D micro-display is time-modulated and the movement of the fixed-curve mirror is synchronized, a virtual 3D image is formed with depth ±Δc that can be seen by a single eye of the viewer as a virtual true 3D image.

All features of the previously disclosed systems (curved-surface micro-display, multiple micro-displays, rotatable fixed-curve mirror, etc.) can be utilized in the various disclosed embodiments of this aspect of the invention.

Design Example of a See-through 3D Image Optical System

Referring to FIG. 1, assume the active area of the 2D micro-display is 6.4×3.6 mm. (It could, e.g., be an OLED with 0.01×0.01 mm pixel size, so the total pixels are 640×360). The fixed-curve spherical mirror has a curvature radius (R) of 40 mm; its focal length f=20 mm. If a=9.8 mm and b=10 mm, then c=1970 mm (from Eq. 3). A simulation was run with the above parameters using Zemax optical software. In the simulation, the eye is assumed to be 30 mm away from the center of $BS_1$, with a pupil diameter of 6 mm. The clear aperture diameter of the spherical mirror is 20 mm and of $BS_1$, 18 mm. The following tables show the all of the parameters and results.

TABLE 1

| R (mm) | | 40 |
|---|---|---|
| f (mm) | | 20 |
| a (mm) | | 9.8 |
| 2D image size (mm) | | 6.4 × 3.6 |
| Clear aperture | Mirror | 20 |
| diameter (mm) | BS(1) | 18 |

TABLE 2

| b (mm) | 10 | 10.05 | d (mm) | 0.05 |
|---|---|---|---|---|
| c (mm) | 1970 | 2637 | Δc (mm) | 667 |
| Virtual image size (mm) | 640 × 360 | 853 × 480 | | |

With the mirror at its initial position b=10 mm, a virtual image is formed 2 m away from the eye (c=1970 mm) with a size of 640×360 mm. When the mirror moves only 0.05 mm, the virtual image moves further away with c=2637 mm. This provides a depth of 667 mm within which the 3D image is formed.

Figure 7A:
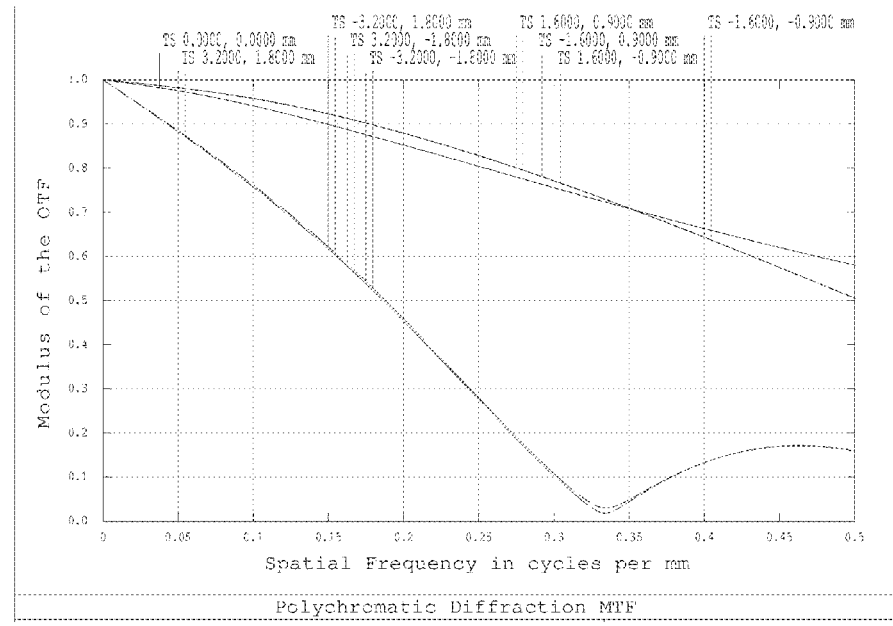
FIG. 7A shows the MTF of a virtual image at distance c according to a design example presented herein below using a flat surface micro-display.
Figure 7B:
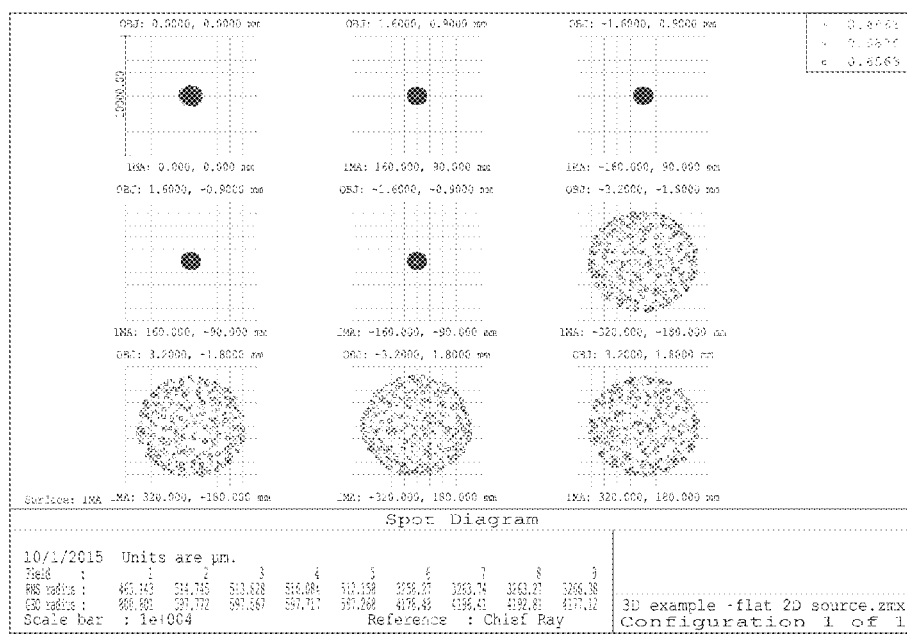
FIG. 7B shows a spot diagram of a virtual image at distance c according to a design example presented herein below using a flat surface micro-display.

FIG. 7A shows the MTF and FIG. 7B the beam spots of the virtual image at c=1970 mm from center to four corners. It can be seen that the image quality at the corners is significantly degraded due to spherical mirror-induced aberrations.

Figure 8:
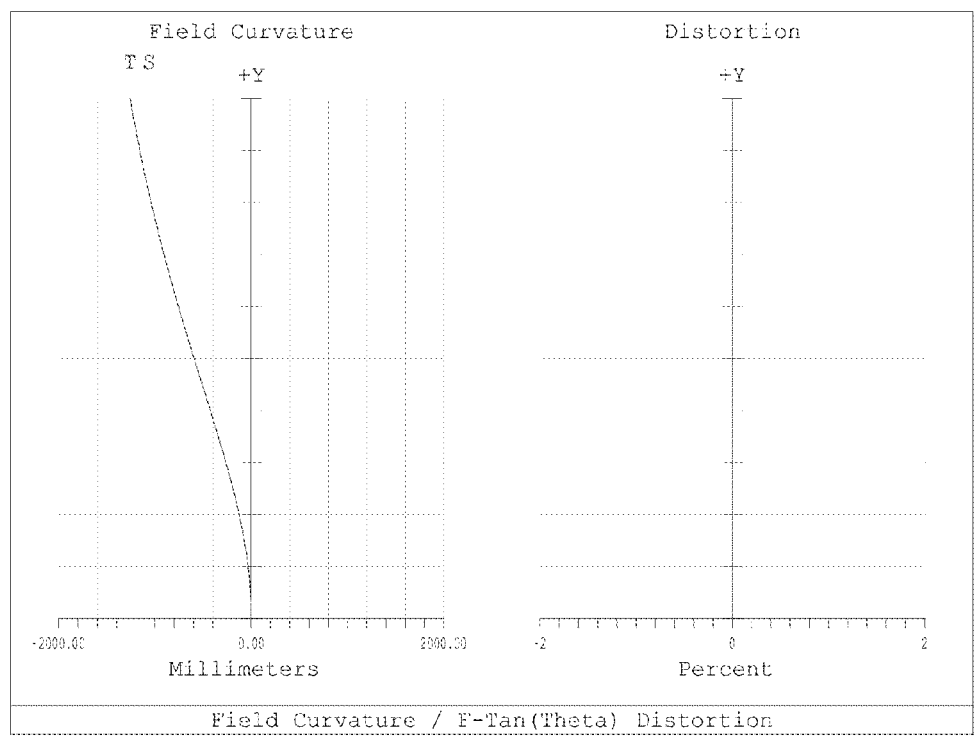
FIG. 8 shows the field curvature and distortion for the virtual image according to the design example presented herein below using the flat surface micro-display.

FIG. 8 shows the field curvature, which is also significant due to the spherical mirror; however, there the spherical mirror produces no distortion for the virtual image.

Figure 9A:
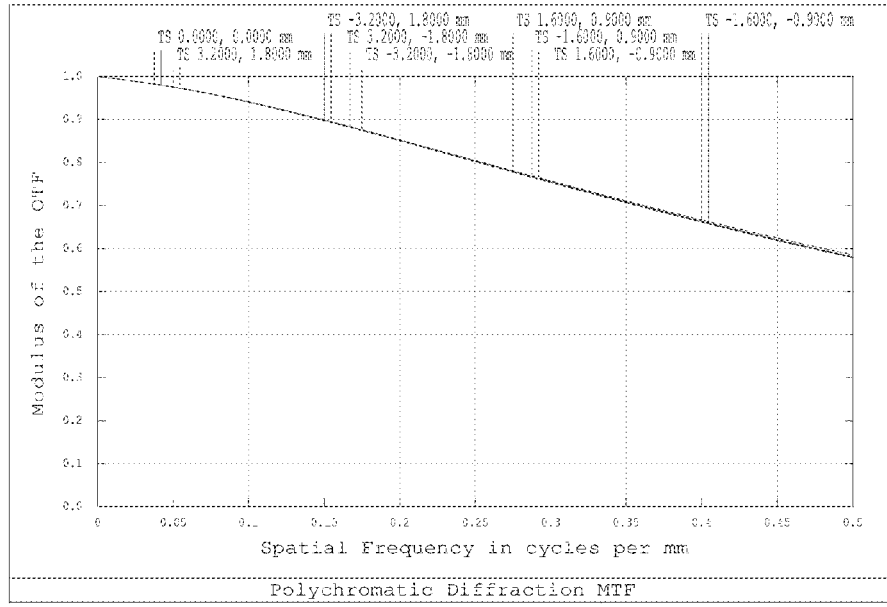
FIG. 9A shows the MTF of a virtual image according to the design example presented herein below using a curved surface micro-display.
Figure 9B:
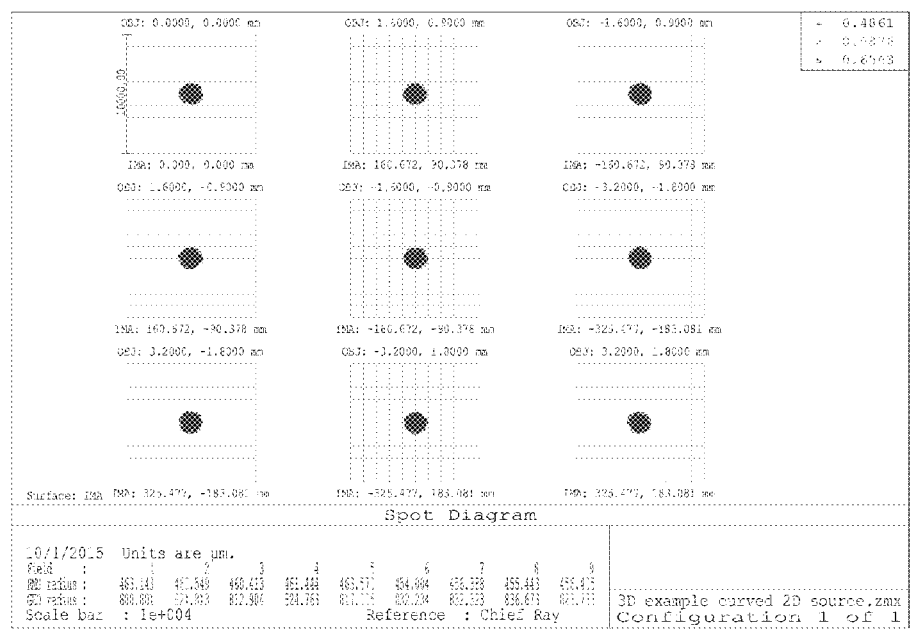
FIG. 9B shows a spot diagram of a virtual image at distance c according to a design example presented herein below using a flat surface micro-display.
Figure 10:
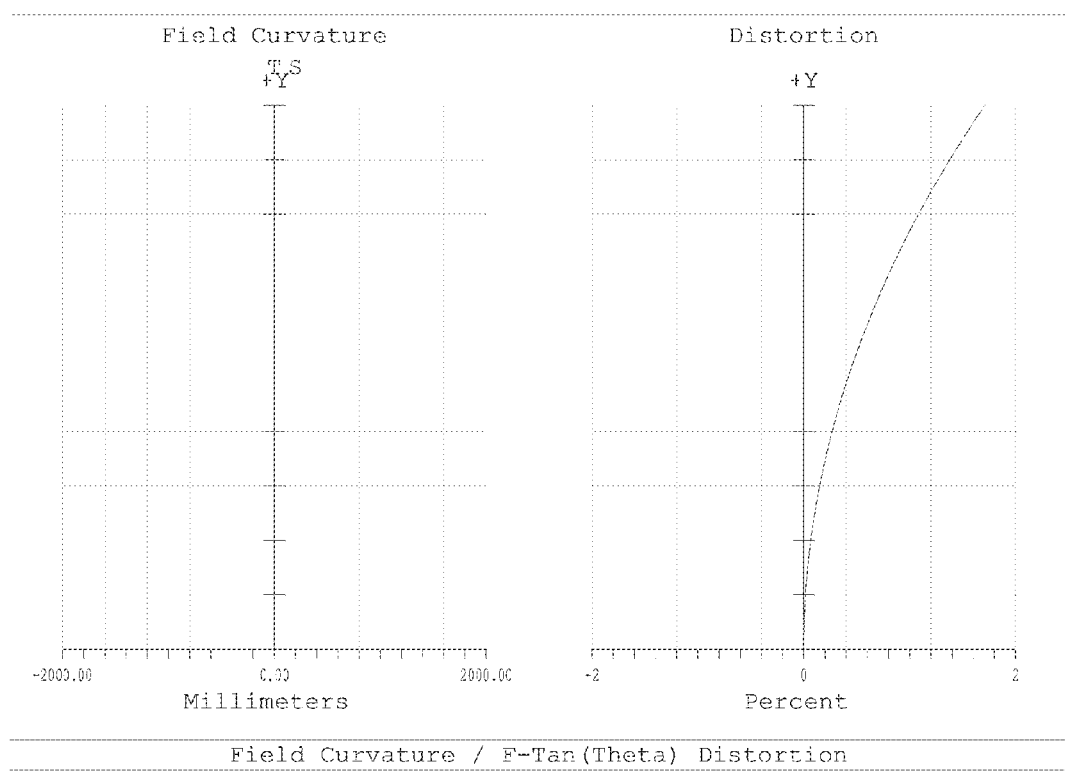
FIG. 10 shows the field curvature and distortion for the virtual image according to the design example presented herein below using the curved surface micro-display.

Referring now to the curved-micro-display embodiment illustrated in FIG. 4, we report the effects if the 2D (flexible) OLED micro-display is made to be spherical. A best curvature radius r=20 mm of the spherical 2D micro-display was found through Zemax simulation. The same parameters and results as in Tables 1 and 2 are still effective for this case. As shown in FIGS. 9A, 9B, and 10, there is significant improvement in image quality (MTF and beam spot size), uniformity over the field, and field curvature; distortion is not zero but is acceptable at less than 2%.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As may be used herein and in the appended claims for purposes of the present disclosure, the term 'about' means the amount of the specified quantity plus/minus a fractional amount of or reasonable tolerance thereof that a person skilled in the art would recognize as typical and reasonable for that particular quantity or measurement. Likewise, the term 'substantially' means as close to or similar to the specified term being modified as a person skilled in the art would recognize as typical and reasonable as opposed to being intentionally different by design and implementation.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

I claim:

1. An optical viewing system for generating a virtual true 3D image viewable by a single eye of a viewer, comprising:
   a fixed-curve mirror characterized by a focal point and a vertex disposed along an optical axis of the system;
   an actuator coupled to the fixed-curve mirror that can impart a translational motion over a distance, d, of the fixed-curve mirror along the optical axis;
   a first addressable image-generator disposed along the optical axis that is configured to generate a time modulated, 2D image;
   a first beam splitter disposed along the optical axis between the fixed-curve mirror and the first addressable image-generator, the orientation of which defines an optical viewing axis,
   wherein a virtual image of the time modulated, 2D real image is formed at a distance, c, from the first beam splitter in a virtual image plane along the optical viewing axis, further wherein, upon translational motion of the curved mirror, a sequential plurality of 2D virtual images are formed in a corresponding plurality of virtual image planes, further wherein, upon temporal synchronization of the translational motion of the fixed-curve mirror and the time modulated, 2D image, a virtual true 3D image is formed and viewable by the single eye of the viewer positioned along the optical viewing axis.

2. The optical viewing system of claim 1, further comprising:
   a second beam splitter disposed along the optical axis of the system between the addressable image-generator and the first beam splitter, the orientation of which defines an another optical axis; and
   a second addressable image-generator disposed along the other optical axis.

3. The optical viewing system of claim 1, wherein the first addressable image-generator has a curved surface.

4. The optical viewing system of claim 2, wherein the first and second addressable image-generators have curved surfaces.

5. The optical viewing system of claim 1, wherein the fixed-curve mirror is rotatable along at least one axis that is orthogonal to the optical axis.

6. The optical viewing system of claim 2, wherein the fixed-curve mirror is rotatable along at least one axis that is orthogonal to the optical axis.

7. The optical viewing system of claim 1, wherein the fixed-curve mirror has a spherical reflection surface.

8. The optical viewing system of claim 1, wherein the fixed-curve mirror has an aspheric reflection surface.

9. The optical viewing system of claim 1, wherein the first addressable image-generator is one of an OLED, a LCOS, a DLP, a LCD.

10. The optical viewing system of claim 2, wherein the first and second addressable image-generators are one of an OLED, a LCOS, a DLP, a LCD.

11. The optical viewing system of claim 1, wherein the virtual true 3D image is viewable by a left eye of the viewer.

12. The optical viewing system of claim 1, wherein the virtual true 3D image is viewable by a right eye of the viewer.

13. The optical viewing system of claim 1, wherein the actuator is a MEMS or silicon-based device.

14. The optical viewing system of claim 2, wherein the actuator is a MEMS or silicon-based device.

15. The optical viewing system of claim 1, wherein the actuator is a piezo-based device.

16. The optical viewing system of claim 2, wherein the actuator is a piezo-based device.

17. The optical viewing system of claim 1, wherein the actuator is a VCM or VCA-based device.

18. The optical viewing system of claim 2, wherein the actuator is a VCM or VCA-based device.

19. The optical viewing system of claim 1, comprising a see-through optical viewing system.

20. The optical viewing system of claim 2, comprising a see-through optical viewing system.

21. The optical viewing system of claim 1, wherein at least a portion of the optical axis of the system consists of the optical viewing axis and the fixed-curve mirror and the coupled actuator are disposed along the optical viewing axis.

22. The optical viewing system of claim 21, further comprising:
   a second beam splitter disposed along the optical axis of the system between the addressable image-generator and the first beam splitter, the orientation of which defines an another optical axis; and
   a second addressable image-generator disposed along the other optical axis.

23. The optical viewing system of claim 21, comprising a non-see-through optical viewing system.

24. The optical viewing system of claim 22, comprising a non-see-through optical viewing system.

25. A method for displaying a virtual true 3D image viewable by a single eye of a viewer, comprising:

providing an optical viewing system comprising:

a fixed-curve mirror characterized by a focal point and a vertex disposed along an optical axis of the system; an actuator coupled to the fixed-curve mirror that can impart a translational motion over a distance, d, to the fixed-curve mirror along the optical axis; a first addressable image-generator disposed along the optical axis that is configured to generate a time modulated, 2D image; a first beam splitter disposed along the optical axis between the fixed-curve mirror and the first addressable image-generator, the orientation of which defines an optical viewing axis;

forming a virtual image of the time modulated, 2D image at a distance, c, from the first beam splitter in a virtual image plane along the optical viewing axis;

moving the curved mirror to generate a sequential plurality of 2D virtual images in a corresponding plurality of virtual image planes;

temporally synchronizing the movement of the fixed-curve mirror and the time modulated, 2D real image, wherein a virtual true 3D image is viewable by the single eye of the viewer positioned along the optical viewing axis.

26. The method of claim 25, further comprising using a second addressable image-generator to increase the resolution of the images viewable by the viewer.

27. The method of claim 25, further comprising rotating the fixed-curve mirror along at least one axis that is orthogonal to the optical axis.

* * * * *